(12) United States Patent
Soldati et al.

(10) Patent No.: US 9,661,581 B2
(45) Date of Patent: May 23, 2017

(54) POWER CONTROL IN A WIRELESS COMMUNICATION SYSTEM

(71) Applicant: Huawei Technologies Co., Ltd., Shenzhen, Guangdong (CN)

(72) Inventors: Pablo Soldati, Kista (SE); Branislav Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 14/322,580

(22) Filed: Jul. 2, 2014

(65) Prior Publication Data

US 2014/0342768 A1 Nov. 20, 2014

Related U.S. Application Data

(63) Continuation of application No. PCT/EP2012/050006, filed on Jan. 2, 2012.

(51) Int. Cl.
  H04W 52/24 (2009.01)
  H04B 7/02 (2017.01)
  (Continued)

(52) U.S. Cl.
  CPC .......... H04W 52/241 (2013.01); H04B 7/024 (2013.01); H04W 52/08 (2013.01);
  (Continued)

(58) Field of Classification Search
  CPC ... H04W 52/146; H04W 52/08; H04W 52/10; H04W 52/40; H04W 92/20;
  (Continued)

(56) References Cited

U.S. PATENT DOCUMENTS

| 6,978,151 B2 * | 12/2005 | Choi et al. ............ | H04W 52/26 |
| 2009/0005105 A1 * | 1/2009 | Hwang ................ | H04W 52/10 |
|  |  |  | 455/522 |

(Continued)

FOREIGN PATENT DOCUMENTS

| WO | WO 2010107885 A2 | 9/2010 |
| WO | WO 2010127623 A1 | 11/2010 |

(Continued)

OTHER PUBLICATIONS

Cox, linear vs log averaging, 1966 http://scitation.aip.org/docserver/fulltext/asa/journal/jasa/39/4/1.1909942.pdf?expires=1441292177&id=id&accname=2110913&checksum=F96498034AA3C1E1397F78F1AEE71475.*

(Continued)

*Primary Examiner* — Ping Hsieh
*Assistant Examiner* — James Yang
(74) *Attorney, Agent, or Firm* — Leydig, Voit & Mayer, Ltd.

(57) ABSTRACT

The present invention relates to a method for power control in a wireless communication system comprising at least one mobile station and N number of coordinated reception points with indices n=1, . . . , N, with the coordinated reception points being spatially separated and adapted for receiving transmissions from the mobile station, the method comprising the steps of: estimating a propagation loss metric $L_{UL}$ for the mobile station, the propagation loss metric $L_{UL}$ being a weighted sum of individual propagation losses $L_n$ from the mobile station to the coordinated reception points expressed in dB multiplied with associated weights $w_n$; and using propagation loss metric $L_{UL}$ for power control of mobile station. Furthermore, the invention also relates to a method in a network control device, a method in a mobile station, a (Continued)

computer program, a computer program product, a network control device and a mobile station device.

21 Claims, 5 Drawing Sheets

(51) Int. Cl.
*H04W 52/14* (2009.01)
*H04W 52/08* (2009.01)
*H04W 52/10* (2009.01)
*H04B 7/024* (2017.01)

(52) U.S. Cl.
CPC ......... *H04W 52/10* (2013.01); *H04W 52/146* (2013.01); *H04W 52/242* (2013.01)

(58) Field of Classification Search
CPC . H04W 52/245; H04W 52/367; H04W 24/10; H04B 7/024; H04B 7/0486; H04L 5/0048; H04L 1/20
See application file for complete search history.

(56) References Cited

U.S. PATENT DOCUMENTS

| | | | |
|---|---|---|---|
| 2010/0278103 A1* | 11/2010 | Park | H04L 1/0019 370/328 |
| 2011/0098054 A1* | 4/2011 | Gorokhov | H04B 7/024 455/452.1 |
| 2012/0052904 A1 | 3/2012 | Gao et al. | |
| 2012/0127911 A1 | 5/2012 | Nishikawa et al. | |

FOREIGN PATENT DOCUMENTS

| | | |
|---|---|---|
| WO | WO 2010150807 A1 | 12/2010 |
| WO | WO2012134531 * | 10/2012 |

OTHER PUBLICATIONS

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.4.0, pp. 1-125, 3$^{rd}$ Generation Partnership Project, Valbonne, France (Dec. 2011).

"3$^{rd}$ Generation Partnership Project; Technical Specification Group Radio Access Network; Evolved Universal Terrestrial Radio Access (E-UTRA); Physical layer; Measurements (Release 10)," 3GPP TS 36.214, V10.1.0, pp. 1-13, 3$^{rd}$ Generation Partnership Project, Valbonne, France (Mar. 2011).

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.4.0, pp. 1-296, 3$^{rd}$ Generation Partnership Project, Valbonne, France (Dec. 2011).

"3$^{rd}$ Generation Partnership Project; Technical Specification Group Radio Access Network; Coordinated multi-point operation for LTE physical layer aspects (Release 11)," 3GPP TR 36.819, V11.1.0, pp. 1-69, 3$^{rd}$ Generation Partnership Project, Valbonne, France (Dec. 2011).

"Power control design for UL CoMP scenario 3 and 4," 3GPP TSG RAN WG1 Meeting #66b, Zhuhai, China, R1-112908, 3$^{rd}$ Generation Partnership Project, Valbonne, France (Oct. 10-14, 2011).

"Uplink power control discussions for CoMP," 3GPP TSG RAN WG1 Meeting #66bis, Zhuhai, China, R1-112964, 3$^{rd}$ Generation Partnership Project, Valbonne, France (Oct. 10-14, 2011).

"Consideration for uplink power control in UL CoMP," 3GPP TSG RAN WG1 Meeting #66bis, Zhuhai, China, R1-113001, 3$^{rd}$ Generation Partnership Project, Valbonne, France (Oct. 10-14, 2011).

"Uplink power control enhancement in new deployment scenarios," 3GPP TSG RAN1 #66bis, Zhuhai, China, R1-113111, 3$^{rd}$ Generation Partnership Project, Valbonne, France (Oct. 10-14, 2011).

"Uplink Power Control with UL CoMP," 3GPP TSG-RAN WG1 Meeting #66bis, Zhuhai, China, R1-113150, 3$^{rd}$ Generation Partnership Project, Valbonne, France (Oct. 10-14, 2011).

"Uplink power control in non-uniform network," 3GPP TSG-RAN WG1 Meeting #66bis, Zhuhai, China, R1-113177, 3$^{rd}$ Generation Partnership Project, Valbonne, France (Oct. 10-14, 2011).

"Considerations on Enhanced Uplink Power Control for CoMP Scenario 4," 3GPP TSG RAN WG1 Meeting #66b, Zhuhai, China, R1-113470, 3$^{rd}$ Generation Partnership Project, Valbonne, France (Oct. 10-14, 2011).

"Enhancements for Uplink Power Control," 3GPP TSG RAN WG1 Meeting #66bis, Zhuhai, China, R1-113493, 3$^{rd}$ Generation Partnership Project, Valbonne, France (Oct. 10-14, 2011).

"Uplink Power Control for CoMP," 3GPP TSG RAN WG1 Meeting #67, San Francisco, USA, R1-113989, 3$^{rd}$ Generation Partnership Project, Valbonne, France (Nov. 14-18, 2011).

* cited by examiner

POWER CONTROL IN A WIRELESS COMMUNICATION SYSTEM

CROSS-REFERENCE TO RELATED APPLICATIONS

This application is a continuation of International Patent Application No. PCT/EP2012/050006, filed on Jan. 2, 2012, which is hereby incorporated by reference in its entirety.

TECHNICAL FIELD

The present invention relates to a method for power control in a wireless communication system. Furthermore, the invention also relates to a method in a network control device, a method in a mobile station, a computer program, a computer program product, a network control device and a mobile station device.

BACKGROUND OF THE INVENTION

A Transmission Point (TP) in conventional MIMO OFDM cellular systems consists of a set of co-located transmit antennas and corresponds to a serving cell for a given Reception Point (RP). Transmission points exploit closed-loop precoding based on Channel State Information (CSI) feedback to enhance the system throughput. A CSI Reference Signal (CSI-RS) is sent from each antenna of the transmission point and used at the receiver to compute the CSI feedback reflecting the channel quality between a set of co-located antennas at the transmitter and a set of co-located antennas at the receiver. Data and reference signals transmitted from different TPs interfere with each other. To minimize interference, the reference signals transmitted from different points are typically placed in orthogonal resource elements where no data can be transmitted. CSI-RS time-frequency patterns of different TPs are signalled to the receiver from the serving TP, see e.g. 3GPP LTE Rel-10 systems.

More advanced systems exploit Coordinated Multi-Point (CoMP) operation to enable coordinated Downlink (DL) transmission and/or Uplink (UL) reception from/at multiple geographically separated points, forming a so called CoMP cooperating set. CoMP was agreed, for instance, as part of the 3GPP LTE Rel-11, both in downlink and in uplink (3GPP TR 36.819, "Technical Specification Group Radio Access Network; Coordinated Multi-Point Operation for LTE Physical Layer Aspects" (Rel-11)).

Joint Processing (JP) is used to make data for a UE available at multiple TPs within the CoMP cooperating set. Joint Transmission (JT) allows simultaneous data transmission from multiple points to a single or multiple UEs in a time-frequency resource. Dynamic point selection (DPS)/muting can enable data transmission from one point in a time-frequency resource. Through Coordinated Scheduling/Beamforming (CS/CB), data for a UE is only available at, and transmitted from, one point in the CoMP cooperating set for a time-frequency resource but UE scheduling/beamforming is coordinated among points in the CoMP cooperating set.

Coordinated multi-point reception implies coordination in UL between geographically separated RPs, such as Joint Reception (JR) of the physical uplink shared channel (PUSCH) transmission at multiple RPs, and/or coordinated scheduling (CS) decisions among points to control interference and improve coverage.

With coordinated multi-point operation, a more advanced receiver may be signalled several sets of CSI-RS patterns by the transmitter. The CoMP cooperating set can consist of macro-cell(s) and low-power Remote Radio Head(s) (RRH) with the same or different cell-ID. Different cell-IDs allow defining orthogonal reference signals that the UE can use to distinguish signals from different TPs. If the same cell-ID is used within the CoMP cooperating set, the UE cannot distinguish the DL signals. This affects, for instance, the propagation loss estimation for power control.

Currently, the UL power control in 3GPP LTE Rel-8/9/10 systems combines an open-loop term and a closed-loop correction term. The UE PUSCH transmit power to a serving cell c in subframe i is given in 3GPP TS 36.213, "Evolved Universal Terrestrial Access (E-UTRA); Physical Layer Procedures", Release 10 as:

$$P_{PUSCH,c}(i) = \min \begin{cases} P_{CMAX,c} \\ 10\log_{10}(M_{PUSCH,c}(i)) + P_{O\_PUSCH,c}(j) + \alpha_c(j)PL_c + \Delta_{TF,c} + f_c(i), \end{cases} \quad (1)$$

[dBm], where $$PL_c = RSTP - RSRP \quad (2)$$

is the DL propagation loss computed at the UE, RSTP is the DL reference-signal transmit power defined as the linear average over the power contributions of all resource elements that carry Cell-specific ReHference Signals (CRS) within the operating system bandwidth, and RSRP is the reference signal received power as defined in 3GPP TS 36.214, "Evolved Universal Terrestrial Access (E-UTRA); Physical Layer—Measurements", Release 10; with the higher layer filter configuration provided in 3GPP TS 36.331, "Evolved Universal Terrestrial Access (E-UTRA); Radio Resource Control (RRC) Protocol Specification", Release 10.

In equation (1), $P_{CMAX,c}$ is the configured UE maximum transmit power as defined in 3GPP TS 36.213, "Evolved Universal Terrestrial Access (E-UTRA); Physical Layer Procedures", Release 10; $M_{PUSCH,c}(i)$ denotes the instantaneous PUSCH bandwidth measured in number of resource blocks valid for subframe i; $P_{O\_PUSCH}(j)$ is a cell-specific parameter broadcasted as part of the cell system information; $\Delta_{TF,c}$ reflects the fact that different SINR can be required for different modulation schemes and coding rates used for PUSCH transmission; and $\alpha_c(j)$ is a 3-bit cell specific parameter provided by higher layers for partial path loss compensation. The term $10 \log_{10}(M_{PUSCH}(i))$ reflects the fact that what is fundamentally controlled by the parameter $P_{0\text{-}PUSCH}(j)$ is the power per resource block. Ultimately, $P_{PUSCH}$ is tuned to guarantee a minimum received power required to support a specific code and modulation scheme. This UL power control does not immediately apply to CoMP for the difficulty in estimating the UL propagation loss.

The uplink communication paradigm in conventional cellular systems implies a point-to-point communication between a transmission point and a reception point. The uplink propagation loss is univocally defined as the signal attenuation between the transmitter and the receiver. With co-located transmission/reception points in uplink and downlink, the uplink path loss can be estimated by exploiting the DL/UL channel reciprocity, for instance, via the LTE open-loop path loss estimation in equation (2).

The uplink CoMP reception mode, on the other hand, can significantly differ from the uplink of conventional cellular systems. Both the downlink transmission to and the uplink reception from a UE may involve multiple geographically separated points, and the set T of DL TPs may not coincide with the set R of UL RPs as in FIG. 1.

The existence of multiple reception points of the same transmitted signal from a UE in UL CoMP reception mode causes the problem of determining a single basic metric that encompasses the total signal attenuation when a signal is jointly received by multiple points.

The metric, hereafter referred to as virtual propagation loss, shall reflect the amount of power adjustment needed at the UE to maintain a desired total quality of service provided jointly by all multiple reception points. In principle, this metric is a function of all separate propagations losses to each of the reception points, but the open issue is how that function should look like, even on a general level.

Recent work proposed a number of ways to define a propagation loss metric for uplink CoMP reception mode. To unify the description of these proposals, a CoMP cooperating set is considered consisting of K points labelled $k=1, \ldots, N$. Within this set, $N \leq K$ points indexed by $n=1, \ldots, N$ form a coordinated reception point set R associated with a specific UE (mobile station) Further, let $P_k$ and $L_k$ denote the transmit power (in decibels) of the k-th point in the CoMP cooperating set and the path loss (in decibels) from the UE, respectively, where $P_k$ takes value $P_{macro}$ when associated with the downlink transmission from a macro-cell. The value $P_{macro}$ is signalled to the UE by higher layers as part of system information.

A simple way to define a path loss for uplink CoMP reception mode is to reuse the LTE rel-8/9/10 open-loop path loss estimation in equation (2) based on downlink measurement of a common CRS reference signal. Assuming that all transmission points share the same cell ID (hence the same CRS reference signal), the RSRP term in equation (2) would account for the superposition of the DL signals from all transmission points, thus yielding $$L_{UL,LTE} = RSTP - 10\log_{10}\left(\sum_{k=1}^{K} 10^{\frac{P_k - L_k}{10}}\right) \text{ [dB]}, \quad (3)$$

where RSTP is assumed to be the macro-cell transmission power $P_{macro}$.

The metric $L_{UL,LTE}$, however, can be rather inaccurate since is computed upon a DL transmission from all points in the CoMP cooperating set while the UL reception point set R may consist of fewer points.

Moreover, formally speaking $L_{UL,LTE}$ is not representative of path loss as it admits, at least in theory, negative values. To illustrate this statement, we consider a CoMP cooperating set with a macro cell and K-1 RRHs with RSTP=$P_{macro}$. Let $$\tilde{P}_{macro} = 10^{\frac{P_{macro} - L_{macro}}{10}} \text{ and } \tilde{P}_n = 10^{\frac{P_n - L_n}{10}} = \varepsilon_n \tilde{P}_{macro}$$

denote the received power (in linear-scale) from the macro cell and RRH, where $\varepsilon_k$ is the ratio between the UE's received power from the k-th RRH and the macro cell. Assuming that same $\varepsilon$ applies to all RRHs, the term $L_{UL,LTE}$ becomes negative for $$\varepsilon > \left(10^{\frac{L_{macro}}{10}} - 1\right) / (K - 1).$$

By analogy with the single transmission/reception point case, another definition of path loss for uplink CoMP reception has been proposed as the difference between the UE's transmit power $P_{UE}$(dB) and total received power (dB) by all reception points in R:

$$P_{RX,tot} = P_{UE} + 10\log_{10}\left(\sum_{n=1}^{N} 10^{-\frac{L_n}{10}}\right) \Rightarrow L_{UL,eff} = \quad (4)$$

$$P_{UE} - P_{RX,tot} = -10\log_{10}\left(\sum_{n=1}^{N} 10^{-\frac{L_n}{10}}\right) \text{ [dB]}$$

A power control compensating $L_{UL,eff}$, referred to as effective path loss, regulates the total received power by all RPs. Notice that $L_{UL,LTE} = L_{UL,eff}$ if and only if the downlink transmission point set T and the uplink reception point set R are the same and all transmission points use the same RSTP.

However, a power control scheme that compensates for the metric $L_{UL,eff}$ would not produce enough power to compensate even the path loss toward the closest RP. To prove this statement, we consider an UL transmission from the UE with power $P_{UE}$. The (linear-scaled) total received power by all RPs $P_{RX,tot}$ in equation (4) is larger than (or equal to) the power received by the RP with the smallest propagation loss, i.e.

$$\sum_{n=1}^{N} 10^{\frac{P_{UE} - L_n}{10}} \geq \max_{n=1,\ldots,N}\left\{10^{\frac{P_{UE} - L_n}{10}}\right\} \text{ (linear-scale),} \quad (5)$$

hence $$L_{UL,eff} \leq \min_{n=1,\ldots,N} L_N. \text{ [dB]}. \quad (6)$$

Therefore, the transmit powers $P_{UE,eff}$ and $P_{UE,min}$ that would be produced to compensate the path loss $L_{UL,eff}$ and $$L_{UL,min} = \min_{n=1,\ldots,N} L_N,$$

respectively, are related as $$P_{UE,eff} \leq PU_{UE,min}. \text{ [dB]} \quad (7).$$

To gain more insight into this aspect, we quantify the difference $\Delta L = L_{UL,min} - L_{UL,eff}$ (in decibels) for a heterogeneous network deployment with a macro cell and four RRHs. The macro cell radius is 500 m, and the RRHs are placed by the cell-edge, with 200 m horizontal-spacing and 100 m vertical-spacing as shown in FIG. 2. $\Delta L$ is computed for each UE position by moving the UE along a grid with step 10 m.

In general, $\Delta L$ depends on the UE position (which affects the minimum propagation loss), as well as on how many and which RPs are within the set R. It follows straightforwardly from equation (6) that $\Delta L \geq 0$ for any UE position. FIGS. 2(a)-2(b) illustrate the contour magnitude of $\Delta L = L_{UL,min} - L_{UL,eff}$ when the reception point set R consists of the two best RPs for each UE position, i.e. $L_{UL,eff}$ is computed using the two RPs with the smallest propagation loss, and when R consists of all points, i.e. macro site and four RRHs, respectively. FIG. 3 is the Cumulative Distribution Function (CDF) of the difference ΔL (dB) between the minimum propagation loss $L_{UL,min}$ for each UE position and the path loss to other RPs, taken in increasing order.

The analysis in FIG. 2 indicates that the transmit power produced to compensate for the metric $L_{UL,eff}$ would yield a Signal-to-Noise Ratio (SNR) at the closest RP several dBs smaller than the corresponding SNR if the power control compensated for $L_{UL,min}$. FIG. 3 further suggests that the SNR at the closest and the second closest RPs can differ up to 35 dB, and can be larger for other RPs. Therefore, the propagation loss metric $L_{UL,eff}$ may not be the best candidate for power control with multiple reception points.

Another metric defining the propagation loss in a system with multiple reception points includes a linear average of the individual propagation losses $L_n$ (expressed in linear scale) with per-point path loss weights $w_n$ as follows $$L_{UL,lin-avg} = 10\log_{10}\left(\sum_{n=1}^{N} w_n 10^{\frac{L_n}{10}}\right), \quad (8)$$

or a nonlinear average of the individual propagation losses $L_n$ expressed in linear scale $$L_{UL,nonlin} = 10\log_{10}\left(10^{10/\left(\sum_{n=1}^{N} \frac{1}{L_n}\right)}\right). \quad (9)$$

In alternative, it was proposed to adjust the UE transmit power based on the propagation loss to the closest/furthest RP.

SUMMARY OF THE INVENTION

An object of the present invention is to provide a solution which mitigates or solves the drawbacks of prior art. Especially, to provide efficient uplink power control in wireless communication systems with coordinated multi-point reception. Another object of the present invention is to provide a flexible uplink power control method for wireless communication systems.

According to a first aspect of the invention, the above mentioned objects are achieved by a method for power control in a wireless communication system comprising at least one mobile station and N number of coordinated reception points with indices n=1, . . . , N, said coordinated reception points being spatially separated and adapted for receiving transmissions from said mobile station, said method comprising the steps of:

estimating a propagation loss metric $L_{UL}$ for said mobile station, said propagation loss metric $L_{UL}$ being a weighted sum of individual propagation losses $L_n$ from said mobile station to said coordinated reception points expressed in dB multiplied with associated weights $w_n$; and using said propagation loss metric $L_{UL}$ for power control of said mobile station.

Different embodiments of the method in a wireless communication system are defined in the appended dependent claims.

According to a second aspect of the invention, the above mentioned objects are achieved by a method in a network control device for a wireless communicating system, said wireless communicating system comprising at least one mobile station and N number of coordinated reception points with indices n=1, . . . , N, said coordinated reception points being spatially separated and adapted for receiving transmissions from said mobile station, said method comprising the steps of:

estimating a propagation loss metric $L_{UL}$ for said mobile station, said propagation loss metric $L_{UL}$ being a weighted sum of individual propagation losses $L_n$ from said mobile station to said coordinated reception points expressed in dB multiplied with associated weights $w_n$; and transmitting said propagation loss metric $L_{UL}$ or a power adjustment parameter based on said propagation loss metric $L_{UL}$ to said mobile station.

According to a third aspect of the invention, the above mentioned objects are achieved by a method in a mobile station adapted for communicating in a wireless communication system comprising at least one mobile station and N number of coordinated reception points with indices n=1, . . . , N, said coordinated reception points being spatially separated and adapted for receiving transmissions from said mobile station, said method comprising the steps of:

adjusting uplink transmission power based on a propagation loss metric $L_{UL}$ for said mobile station, wherein said propagation loss metric $L_{UL}$ is a weighted sum of individual propagation losses $L_n$ from said mobile station to said coordinated reception points expressed in dB multiplied with associated weights $w_n$.

The above mentioned methods may also be executed in a computer and comprised in suitable computer programs and computer program products.

According to a fourth aspect of the invention, the above mentioned objects are achieved with a network control device adapted for controlling one or more functions in a wireless communication system, said wireless communicating system comprising at least one mobile station and N number of coordinated reception points with indices n=1, . . . , N, said coordinated reception points being spatially separated and adapted for receiving transmissions from said mobile station, said network control device further being adapted to:

estimate a propagation loss metric $L_{UL}$ for said mobile station, said propagation loss metric $L_{UL}$ being a weighted sum of individual propagation losses $L_n$ from said mobile station to said coordinated reception points expressed in dB multiplied with associated weights $w_n$; and transmit said propagation loss metric $L_{UL}$ or a power adjustment parameter based on said propagation loss metric $L_{UL}$ to said mobile station.

According to a fifth aspect of the invention, the above mentioned objects are achieved with a mobile station device adapted for communicating in a wireless communication system comprising at least one mobile station and N number of coordinated reception points with indices n=1, . . . , N, said coordinated reception points being spatially separated and adapted for receiving transmissions from said mobile station, said mobile station device further being adapted to:

adjust uplink transmission power based on a propagation loss metric $L_{UL}$ for said mobile station, wherein said propagation loss metric $L_{UL}$ is a weighted sum of individual propagation losses $L_n$ from said mobile station to said coordinated reception points expressed in dB multiplied with associated weights $w_n$.

The present invention provides a solution which generalizes and enhances existing power control methods for conventional cellular systems to the case of wireless communication systems with coordinated multi-point reception by means of estimating a single propagation loss metric defined as a weighted sum of the individual propagation losses expressed in dB between a mobile station and the coordinated reception points. The propagation loss metric is then used to adjust the uplink transmit power of the mobile terminal.

Moreover, present invention enables robust uplink power control in a system with multiple geographically separated reception points by ensuring that the uplink transmit power for the mobile station being adjusted on the basis of a propagation loss metric, between the mobile station and the coordinated reception points, that is at least as large as the propagation loss between the mobile station and the closest of the reception points.

The invention also enables flexible uplink power control by means of dynamically changing the algorithm for the selection of weights associated with the individual propagation losses in the estimation of the propagation loss metric.

Furthermore, the invention enables optimal and dynamic uplink power control in a system with multiple geographically separated reception points by means of selecting the weights associated to each reception point to fulfill a wide range of different performance metrics, such as system throughput, individual QoS requirements for the mobile station, interference coordination, and mitigation.

Further applications and advantageous of the invention will be apparent from the following detailed description.

BRIEF DESCRIPTION OF THE DRAWINGS

The appended drawings are intended to clarify and explain different embodiments of the present invention in which.

DETAILED DESCRIPTION OF THE INVENTION

Figure 1:
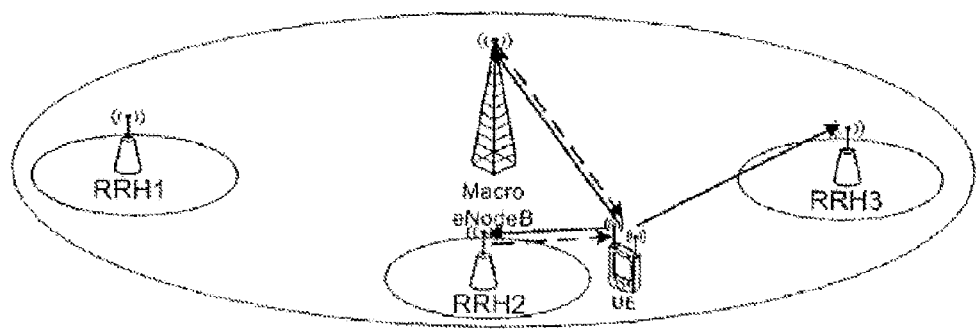
FIG. 1 shows an example of an unbalanced DL/UL CoMP scenario. The macro eNB and RRH3 form the transmission points set T, while macro base station (eNB), RRH2 and RRH3 form the reception point set R.
Figure 2A:
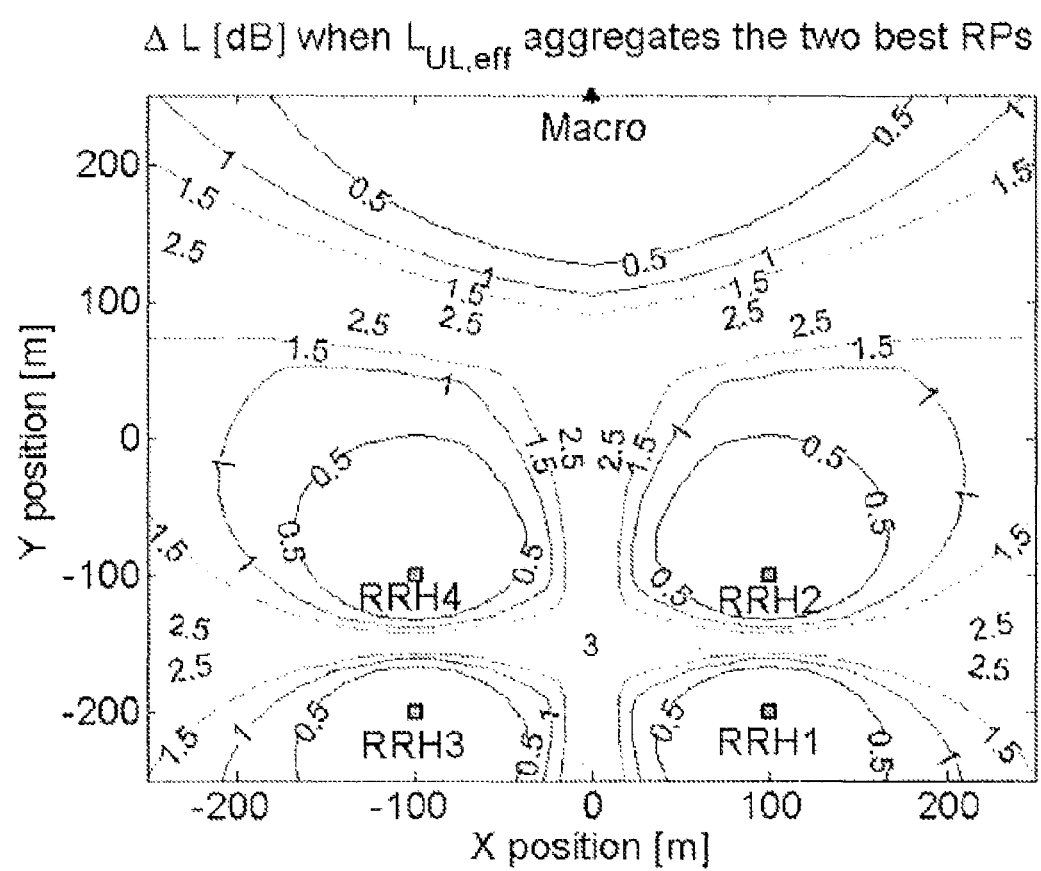
FIGS. 2a and 2b show the difference $\Delta L = L_{UL,min} - L_{UL,eff}$ computed considering, for each UE position within the grid, a reception point set R consisting of the best two RPs in FIG. 2a and all RPs in FIG. 2b.
Figure 2B:
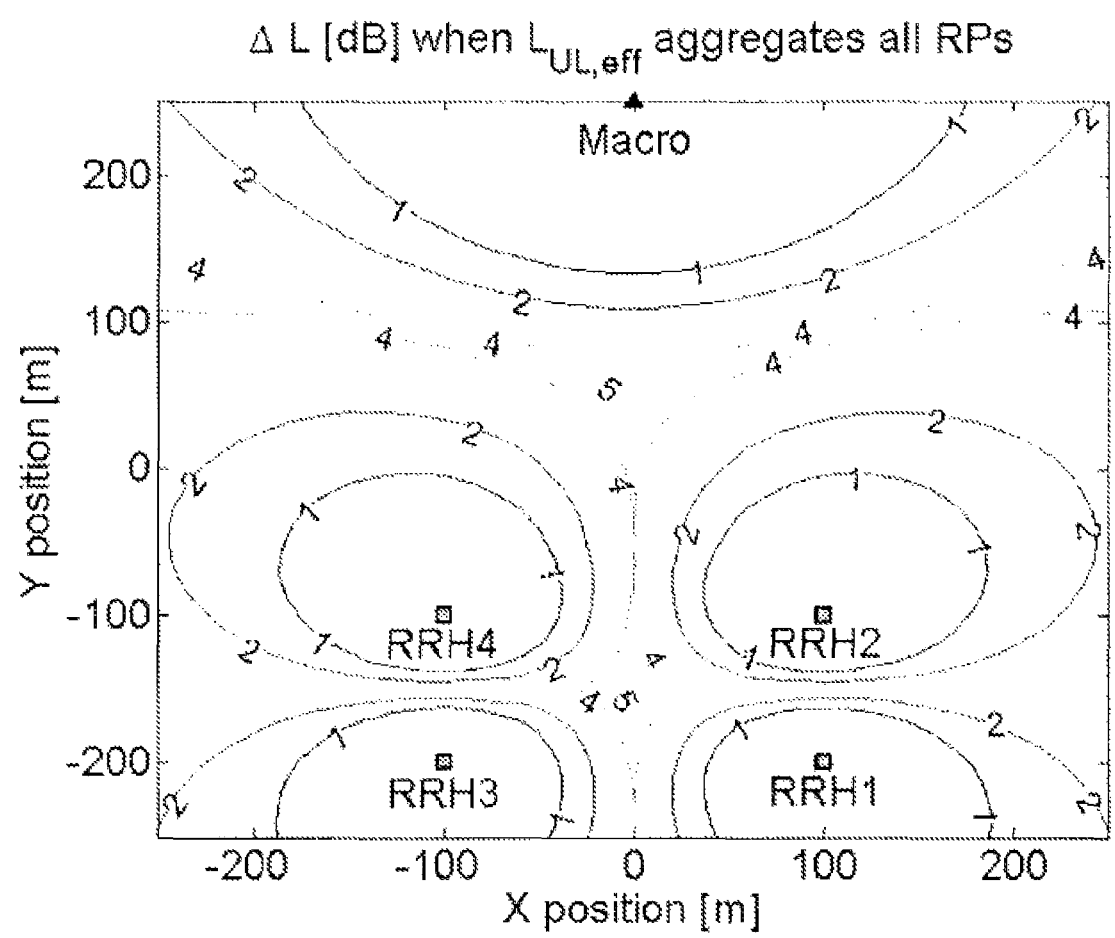
Figure 3:
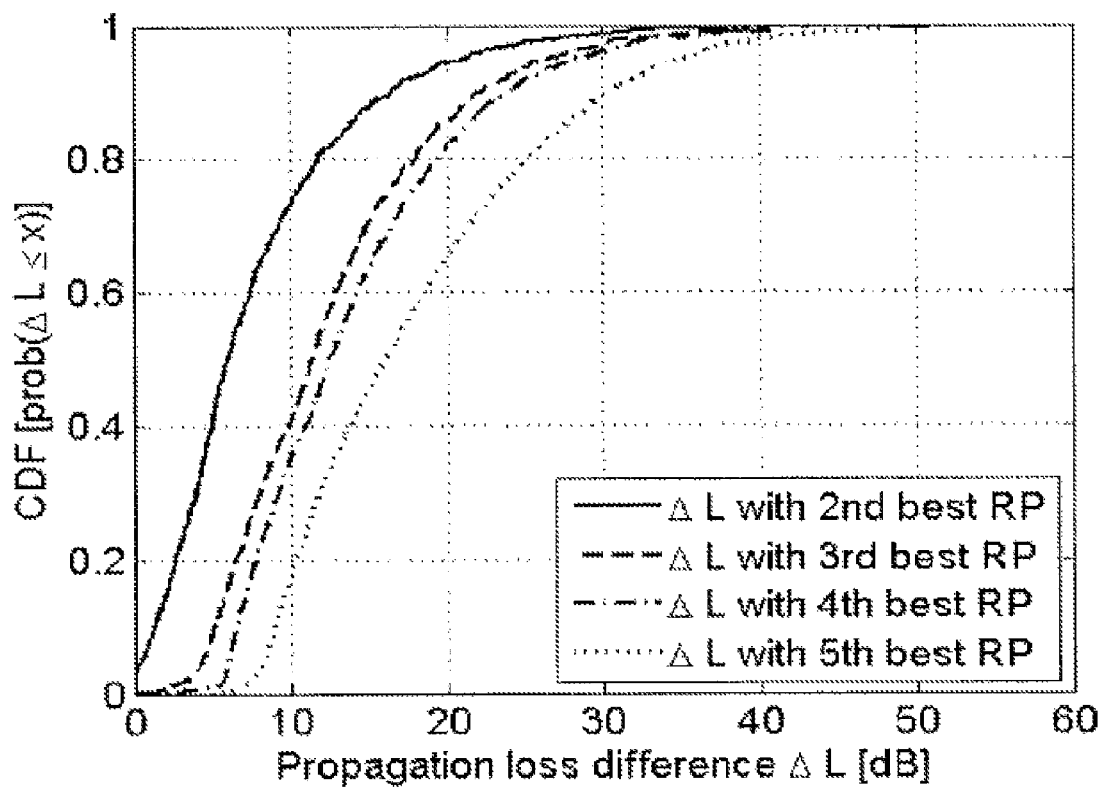
FIG. 3 shows the CDF of the path loss difference $\Delta L$ between $L_{UL,min}$ and the path loss to other RPs.

To achieve the above mentioned objects, the present invention relates to a method for power control in a wireless communication system which comprises at least one mobile station (e.g. a UE) and at least a plurality of coordinated reception points. Assuming that there is N number of coordinated reception points with indices n=1, . . . , N which are spatially separated and adapted for receiving transmissions from the mobile station, the method involves estimating a single propagation loss metric $L_{UL}$ for the mobile station. The propagation loss metric $L_{UL}$ is a weighted sum of individual propagation losses $L_n$ from the mobile station to the coordinated reception points expressed in dB multiplied with associated weights $w_n$; and using the propagation loss metric $L_{UL}$ for power control of the mobile station.

The propagation loss metric $L_{UL}$ can be seen as a virtual propagation loss metric giving a good account of how signals received at different reception points with different attenuations are combined, thereby being useful in power control algorithms.

As noted, an important step in the present invention is the specification of the (virtual) propagation loss metric $L_{UL}$. The path loss metric $L_{UL}$ is a weighted sum of the individual propagation losses expressed in decibels to the individual coordinated reception points defined as $$L_{UL} = \sum_{n=1}^{N} w_n L_n [\text{dB}], \quad (10)$$

$$\text{with } \sum_{n=1}^{N} w_n = 1.$$

Advantages of keeping (and directly using) the individual propagation losses $L_n$ in dB scale are mainly twofold:

There is a direct (linear) relation between the weight $w_n$ associated with the individual propagation losses $L_n$, and the impact of $L_n$ in the metric $L_{UL}$. Reception points that are considered more/less important will receive higher/lower weights, and vice versa. This is not immediately visible, for instance, in equation (8) since it requires to first transform each individual propagation loss $L_n$ in linear scale, and then retransform the weighted sum in log-scale; and An operation is saved since transformation back and forth to linear scale is not needed.

The present method relates to embodiments, corresponding to a number of algorithms, describing how the weights $w_n$ of the virtual the propagation loss metric $L_{UL}$ are selected, and how the corresponding power adjustment is calculated. The different selections of weights $w_n$ allow to fulfill various performance requirements as well as trade off between the worst and best individual propagation loss among the reception points and the interference created in the system.

Accordingly, the path loss metric $L_{UL}$ may take values in the range $[L_{UL,min}, L_{UL,max}]$ where $$L_{UL,min} = \min_{n=1...N} L_n \quad (11)$$

and $$L_{UL,max} = \max_{n=1...N} L_n$$

denote the propagation loss to the closest and to the furthest reception points in R, respectively. These values can be achieved by the following selection of weights $$L_{UL} = L_{UL,min} \text{ if } w_n = \begin{cases} 1 & \text{for } n = n^* \\ 0 & \text{for } n \neq n^* \end{cases} \text{ with } n^* = \operatorname*{argmin}_{n=1...N} L_n \quad (12)$$

$$L_{UL} = L_{UL,max} \text{ if } w_n = \begin{cases} 1 & \text{for } n = n^* \\ 0 & \text{for } n \neq n^* \end{cases} \text{ with } n^* = \operatorname*{argmax}_{n=1...N} L_n. \quad (13)$$

A linear average of the individual path loss to each of the reception points in R is obtained with $$w_n = \frac{1}{N} \forall n. \quad (14)$$

Other embodiments for computing the propagation loss in a system with multiple geographically separated reception points involves linear and nonlinear selections of weights $w_n$, wherein the weights $w_n$ are chosen (but not limited to) according to any of the following algorithms so that the weights $w_n$ are:

Inversely proportional to a normalized version of the individual propagation loss to each reception point expressed in decibels $$w_n = \frac{1/L_n}{\sum_{n=1}^{N} 1/L_n} \forall n; \quad (15)$$

Inversely proportional to a normalized version of the individual propagation loss to each reception point expressed in linear scale $$w_n = \frac{10^{-\frac{L_n}{10}}}{\sum_{n=1}^{N} 10^{-\frac{L_n}{10}}} \forall n; \quad (16)$$

Directly proportional to a normalized version of the individual propagation loss to each reception point expressed in decibels $$w_n = \frac{10^{\frac{L_n}{10}}}{\sum_{n=1}^{N} 10^{\frac{L_n}{10}}} \forall n; \quad (17)$$

Inversely proportional to a normalized version of the exponentially-scaled individual propagation loss to each reception point expressed in decibels $$w_n = \frac{a^{-\frac{L_n}{a}}}{\sum_{n=1}^{N} a^{-\frac{L_n}{a}}}, a > 1, \forall n; \quad (18)$$

Directly proportional to a normalized version of the exponentially-scaled individual propagation loss to each reception point expressed in decibels $$w_n = \frac{a^{\frac{L_n}{a}}}{\sum_{n=1}^{N} a^{\frac{L_n}{a}}}, a > 1, \forall n; \quad (19)$$

Figure 4:
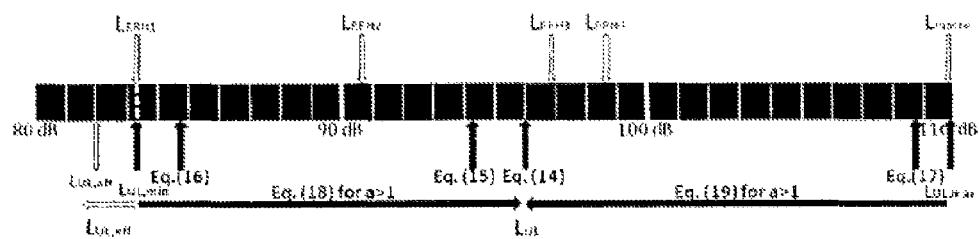
FIG. 4 shows the relationship between different propagation loss metrics for UL CoMP.

To illustrate the relationship between the path loss metric $L_{UL}$ for UL CoMP according to the invention and other prior art metrics, an example for which the propagation loss to the reception points is: $L_{macro}=110$ dB, $L_{RRH1}=83.1$ dB, $L_{RRH2}=90.6$ dB, $L_{RRH3}=96.9$ dB and $L_{RRH4}=98.9$ dB have been considered. The top part of FIG. 4 shows the position of the individual propagation loss to each reception point. The bottom part of FIG. 4 shows that the metric $L_{UL,eff}$ ranges in [82.1, 83.1] dB depending on how many reception points that are used, whereas the present proposed path loss metric $L_{UL}$ takes values in the interval [83.1, 110] dB. FIG. 4 also shows the values of $L_{UL}$ for different selections of weights based on the embodiments in equations (11)-(18), respectively.

Figure 5:
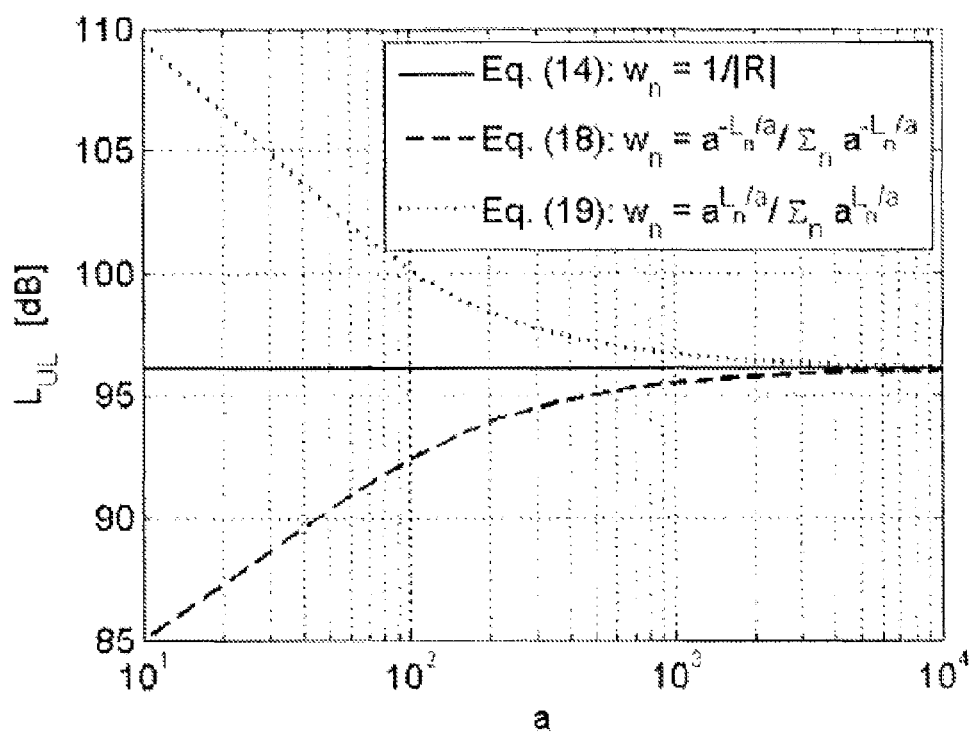
FIG. 5 shows the virtual propagation loss using weights in equations (17) and (18) for a>1.

FIG. 5 further shows that the virtual propagation loss $L_{UL}$ computed with the weights in equation (18) and (19) for a>1 covers the interval $[L_{UL,min}, L_{UL,max}]$ converging to the value of $L_{UL}$ obtained by the weights in equation (13) when a>>1. Parameter a is a control parameter so that equation (18) with a>1 allows to pick a propagation loss metric $L_{UL}$ between the value $L_{UL,min}$ and the plain average value among all reception points. The parameter a allows to control this value, i.e. the larger the value a, the closer the path loss metric becomes to the plain average value among all reception points. For instance, in systems with high interference we may want to use a small value for a, while in systems with low interference we may want to compensate for a larger $L_{UL}$ so as to have higher SINR at each reception point. Equation (19) behaves in the corresponding way but starts from the value $L_{UL,max}$ instead.

According to yet another embodiment of the invention, the algorithm for combining the received signals at the reception points might be reconfigurable, or implementation specific, so it might be desirable to have a possibility to change the algorithm for calculating the weights used for calculation of the virtual propagation loss. Preferably, the selection of this algorithm can be done by signalling from a reception network to which the coordinated reception points belong or from a serving cell controlling the mobile station. Hence, the different selection algorithms can be seen as different selection modes. Thereby, a flexible solution is provided in which different algorithms can be chosen for different performance metrics, such as system throughput, individual QoS requirements for the mobile station, interference coordination, and mitigation.

According to yet another embodiment of the invention, the present method can be used to compute the propagation loss metric $L_{UL}$ in a system with multiple geographically separated reception points on the basis of a subset of all the individual propagation losses to the reception points. Weights $w_n$ associated with the individual propagation losses in the selected subset may be calculated by means of any of the algorithms above, whereas weights $w_n$ associated to the propagation losses outside the chosen subset are set to zero.

Furthermore, the individual propagation losses to each of the reception points can be estimated from the individual downlink transmissions of corresponding orthogonal reference signals, such as CSI-RS reference signals, from each reception point to the mobile station. Orthogonal CSI-RS patterns can be assigned to individual reception points, with non-zero power CSI-RS reference signal configured (in a UE-specific manner) DL transmissions to a UE in separate subframe. CSI-RS DL transmissions from each reception point are used to estimate at the UE the individual propagation loss $L_n$ from each reception point. The power configured for CSI-RS DL transmission shall be signalled to the mobile station. The mobile station can then compute the virtual uplink propagation loss in a system of multiple geographically separated reception points on the basis of the estimated individual propagation losses to each reception point and the associated weights. This embodiment allows computation of the desired path loss metric in open-loop power control by reusing reference signaling already defined in e.g. 3GPP LTE rel-10. Compared to closed-loop methods, this embodiment requires less control signalling with a serving cell controlling a UE, as well as less signalling and coordination between the reception points and the serving cell controlling the UE.

The mobile station may calculate a power adjustment parameter based on the propagation loss metric $L_{UL}$ and use the power adjustment parameter for adjusting uplink transmission power according to another embodiment of the invention.

In the following disclosure two preferred embodiments of closed-loop power control algorithms are presented.

I) A closed-loop power control algorithm based on CSI-RS reference signals (or any other suitable orthogonal reference signals) where the weights $w_n$ are calculated by the serving cell controlling the UE in a recursive way consisting of the following steps:

Estimating, at the reception points, the individual propagation losses $L_n$ from the UE upon an uplink transmission from the UE based for instance on Sounding Reference Signal (SRS), Physical Uplink Control Channel (PUCCH) or Physical Uplink Shared Channel (PUSCH) transmission;

Sending estimated individual propagation losses $L_n$ from each reception point to the serving cell controlling the UE;

Computing the virtual propagation loss $L_{UL}$, at the serving cell controlling the UE, on the basis of the individual uplink propagation losses $L_n$ to each reception point;

Calculating a power adjustment $\Delta L = L_{UL} - L_{UL,min}$, at the serving cell controlling the UE, where $L_{UL,min}$ is the minimum estimated propagation loss among all reception points;

Configuring, at the serving cell controlling the UE, a downlink CSI-RS reference signal transmission from the reception point with the smallest estimated propagation loss from the UE;

Sending the power adjustment $\Delta L$, from the serving cell controlling the UE, to the UE;

Estimating, at the UE, the propagation loss $L_{UL,min}$ to the reception point configured by the serving cell controlling the UE by demodulating the reference signal; and Reconstructing a new power adjustment $L_{UL}$, at the UE on the basis of the power adjustment received from the serving cell controlling the UE and of the estimated propagation loss $L_{UL,min}$ as $L_{UL} = L_{UL,min} + \Delta L$.

II) A closed-loop power control algorithm based on CRS reference signals (or any other common reference signal) where the weights $w_n$ are calculated by the serving cell controlling the UE in a recursive way consisting of the following steps:

Estimating, at the UE, the downlink propagation loss by demodulating the sum of received CRS signals upon a simultaneous downlink transmission of the same CRS reference signal from all points as $$PL_C = RSTP - 10\log_{10}\left(\sum_{k=1}^{K} 10^{\frac{P_k - L_k}{10}}\right), [dB] \quad (20)$$

Computing a power adjustment at the UE based on the estimated downlink propagation loss;

Sending a reference signal from the UE to all reception points so that each reception point estimates the corresponding propagation loss $L_n$ from the UE;

Sending estimated individual propagation losses from each reception point to the serving cell controlling the UE;

Computing the virtual propagation loss, at the serving cell controlling the UE, on the basis of individual uplink propagation losses received from each reception point as $$L_{UL} = L_{macro} - \sum_{n=1}^{N} w_n \beta_n \quad (21)$$
$$= L_{macro} - 10\log_{10}\left(\prod_{n=1}^{N} 10^{\frac{w_n \beta_n}{10}}\right), [dB]$$

where $\beta_n = L_{macro} - L_n$ (decibels), and $L_{macro}$ is the estimated propagation loss from the UE to the serving cell controlling the UE;

Computing a new power adjustment corresponding to $\Delta PL_C = L_{UL} - PL_C$ based on virtual propagation loss at the serving cell controlling the UE as $$\Delta PL_c = 10\log_{10}\left(\sum_{k=1}^{K} 10^{\frac{\alpha_k + \beta_k}{10}} \bigg/ \prod_{n=1}^{N} 10^{\frac{w_n \beta_n}{10}}\right)[dB] \quad (22)$$

where $\alpha_n = P_n - P_{macro}$ (decibels);

Sending the new power adjustment, from the serving cell controlling the UE, to the UE and computing the total power adjustment $L_{UL} = PL_C + \Delta PL_C$ at the UE;

Repeating the above procedure from the beginning

For the special case in which $L_{UL} = L_{UL,min}$, the path loss adjustment in equation (22) computed at the serving cell controlling the UE becomes $$\Delta PL_c = L_{UL} - PL_c \quad (23)$$
$$= 10\log_{10}\left(\sum_{k=1}^{K} 10^{\frac{\alpha_k + \beta_k}{10}} \bigg/ 10^{\frac{\beta_{max}}{10}}\right), [dB]$$

where $$\beta_{max} = L_{macro} - \min_{n=1...N} L_n = L_{macro} - L_{UL,min}.$$

Moreover, the present invention also relates to a method in a network control device and in a mobile station device.

The method in a network control device comprises the steps of: estimating a propagation loss metric $L_{UL}$ for a mobile station, the propagation loss metric $L_{UL}$ being a weighted sum of individual propagation losses $L_n$ from the mobile station to the coordinated reception points expressed in dB multiplied with associated weights $w_n$; and transmitting the propagation loss metric $L_{UL}$ or a power adjustment parameter based on the propagation loss metric $L_{UL}$ to the mobile station. Such a network control device should be capable to support one or more functions/schemes proposed for e.g. CoMP in this disclosure, including e.g.:

Coordination capability, both in DL and UL, among geographically separated points to support, for instance, centralized or distributed scheduling assumption and their message exchange data rate and latency;

Inter- and intra-site multi-point coordination in homogeneous macro networks;

Coordination between a cell(s) and the distributed RRHs connected to the cell(s);

Coordination between different cell layers and within a cell layer in heterogeneous networks;

Support for joint processing (JP) (including joint transmission and/or dynamic point selection/muting), coordinated beamforming and/or scheduling (CB/CS), hybrid solutions of JP and CB/CS; and Support for uplink power control.

The method in a mobile station comprises the step of: adjusting uplink transmission power based on a propagation loss metric $L_{UL}$ for the mobile station, wherein the propagation loss metric $L_{UL}$ is a weighted sum of individual propagation losses $L_n$ from the mobile station to coordinated reception points expressed in dB multiplied with associated weights $w_n$. The mobile station device may e.g. be a UE or any other suitable mobile communication devices adapted for communication in wireless communication systems.

According to an embodiment, the method in the mobile station device further comprises the step of: receiving a power adjustment parameter from a network control device; estimating a downlink path loss from a downlink transmission comprising reference signals, the downlink transmission being sent from at least one reception point; estimating a downlink path loss based on the downlink transmission reference signals; and reconstructing the propagation loss metric $L_{UL}$ based on the received power adjustment parameter and the estimated downlink path loss; and adjusting uplink transmission power based on the reconstructed propagation loss metric $L_{UL}$.

According to another embodiment, the method in the mobile station device further comprises the steps of: estimating the propagation loss metric $L_{UL}$ based on individual propagation losses $L_n$ estimated from downlink transmission of orthogonal reference signals, such as CSI-RSs, associated with each coordinated reception point, respectively; calculating a power adjustment parameter based on the propagation loss metric $L_{UL}$; and adjusting uplink transmission power based on the power adjustment parameter.

Furthermore, as understood by the person skilled in the art, any method according to the present invention may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention also relates to a network control device and a mobile station device corresponding to the above methods. It should be noted that the method in a network control device, the method in a mobile station device, the network control device and the mobile station device can be modified, mutatis mutandis, so as to relate to different embodiments within the scope of the independent claims.

Finally, it should be understood that the present invention is not limited to the embodiments described above, but also relates to and incorporates all embodiments within the scope of the appended independent claims.

What is claimed is:

1. A method for power control in a wireless communication system comprising at least one mobile station and N number of coordinated reception points with indices n=1, ..., N, the coordinated reception points being spatially separated and adapted for receiving transmissions from the at least one mobile station, the method comprising:

receiving, at the at least one mobile station, a first signalling corresponding to a first algorithm corresponding to a first selection mode for estimating a propagation loss metric $L_{UL}$ for the at least one mobile station;

in response to the first signalling, estimating the propagation loss metric $L_{UL}$ for the at least one mobile station based on applying the first algorithm, the propagation loss metric $L_{UL}$ being a weighted sum of individual propagation losses $L_n$ from the at least one mobile station to the coordinated reception points expressed in decibels (dB) multiplied with associated weights $w_n$, wherein a first weight corresponding to a first propagation loss value is different than a second weight corresponding to a second propagation loss value;

using the propagation loss metric $L_{UL}$ for power control of the at least one mobile station;

receiving, at the at least one mobile station, a second signalling corresponding to a second algorithm corresponding to a second selection mode for estimating a second propagation loss metric $L_{UL}$ for the at least one mobile station;

in response to the second signalling, estimating the second propagation loss metric $L_{UL}$ for the at least one mobile station based on applying the second algorithm; and using the second propagation loss metric $L_{UL}$ to change the power control of the at least one mobile station.

2. The method according to claim 1, wherein the propagation loss metric $L_{UL}$ is given by:

$$L_{UL} = \sum_{n=1}^{N} w_n L_n, \text{ where } \sum_{n=1}^{N} w_n = 1.$$

3. The method according to claim 1, wherein the propagation loss metric $L_{UL}$ takes values in the range of $[L_{UL},\text{min}', L_{UL},\text{max}]$, wherein $$L_{UL,min} = \min_{n=1...N} L_n \text{ and } L_{UL,max} = \max_{n=1...N} L_n.$$

4. The method according to claim 1, wherein a sum of the weights $w_n$ is equal to one, and the weights $w_n$ are determined according to any of the following algorithms:

setting all weights to zero except one weight which corresponds to a minimum propagation loss value, i.e.

$$L_{UL,min} = \min_{n=1...N} L_n;$$

setting all weights to zero except one weight which corresponds to a maximum propagation loss value, i.e.

$$L_{UL,max} = \max_{n=1...N} L_n;$$

choosing the weights $w_n$ to be inversely proportional to the number of coordinated reception points N;

choosing the weights $w_n$ to be inversely proportional to a normalised individual propagation loss to each coordinated reception point expressed in dB;

choosing the weights $w_n$ to be inversely proportional to a normalised individual propagation loss to each coordinated reception point expressed in linear scale;

choosing the weights $w_n$ to be directly proportional to a normalised individual propagation loss to each coordinated reception point expressed in dB;

choosing the weights $w_n$ to be inversely proportional to a normalised exponentially scaled individual propagation loss to each coordinated reception point expressed in dB; or choosing the weights $w_n$ to be directly proportional to a normalised exponentially scaled individual propagation loss to each coordinated reception point expressed in dB.

5. The method according to claim 4, wherein the weights $w_n$, are calculated from a subset of the number of coordinated reception points N so that weights associated with coordinated reception points outside the subset are set to zero.

6. The method according to claim 4, wherein a selection of an algorithm is signalled by the communication network to which the coordinated reception points belong, or by a serving cell controlling the at least one mobile station.

7. The method according to claim 1, further comprising:
estimating, by the at least one mobile station, the propagation loss metric $L_{UL}$ based on individual propagation losses $L_n$ estimated from downlink transmission of orthogonal reference signals associated with each coordinated reception point, respectively.

8. The method according to claim 7, further comprising:
calculating, by the at least one mobile station, a power adjustment parameter based on the propagation loss metric $L_{UL}$; and
adjusting, by the at least one mobile station, uplink transmission power based on the power adjustment parameter.

9. The method according to claim 1, further comprising:
estimating, by a serving cell controlling the at least one mobile station, the propagation loss metric $L_{UL}$ based on individual propagation losses $L_n$ estimated from uplink transmissions comprising reference signals from the at least one mobile station.

10. The method according to claim 9, further comprising:
calculating, by the serving cell, a power adjustment parameter based on the propagation loss metric $L_{UL}$;
transmitting, by the serving cell, the power adjustment parameter to the mobile station;
transmitting, by at least one reception point, a downlink transmission comprising reference signals;
estimating, by the at least one mobile station, a downlink path loss based on the downlink transmission reference signals; and
reconstructing, by the at least one mobile station, the propagation loss metric $L_{UL}$ based on the power adjustment parameter and the estimated downlink path loss.

11. The method according to claim 1, wherein
the coordinated reception points are base stations, remote radio heads, low power nodes, and/or repeaters; and the at least one mobile station comprises a user equipment (UE); and
the wireless communication system is a coordinated multi-point (CoMP) wireless communication system.

12. The method according to claim 1, wherein estimating the propagation loss metric $L_{UL}$ for the at least one mobile station is based on a selection mode associated with a performance metric, wherein the performance metric comprises one of the following: a wireless communication system throughput, individual quality of service (QoS) requirements for the mobile station, interference coordination, or mitigation.

13. A method in a network control device for a wireless communicating system, the wireless communicating system comprising at least one mobile station and N number of coordinated reception points with indices n=1, . . . , N, the coordinated reception points being spatially separated and adapted for receiving transmissions from the at least one mobile station, the method comprising:
based on a first algorithm corresponding to a first selection mode for estimating a propagation loss metric $L_{UL}$ for the at least one mobile station, estimating the propagation loss metric $L_{UL}$ for the at least one mobile station, the propagation loss metric $L_{UL}$ being a weighted sum of individual propagation losses $L_n$ from the at least one mobile station to the coordinated reception points expressed in decibels (dB) multiplied with associated weights $w_n$, wherein a first weight corresponding to a first propagation loss value is different than a second weight corresponding to a second propagation loss value;
transmitting the propagation loss metric $L_{UL}$ or a power adjustment parameter based on the propagation loss metric $L_{UL}$ to the at least one mobile station for power control of the at least one mobile station;
based on a second algorithm corresponding to a second selection mode for estimating a second propagation loss metric $L_{UL}$ for the at least one mobile station, estimating the second propagation loss metric $L_{UL}$ for the at least one mobile station; and
transmitting the second propagation loss metric $L_{UL}$ or a second power adjustment parameter based on the second propagation loss metric $L_{UL}$ to the at least one mobile station to adjust the power control of the at least one mobile station.

14. A method in a mobile station adapted for communicating in a wireless communication system comprising at least one mobile station and N number of coordinated reception points with indices n=1, . . . , N, the coordinated reception points being spatially separated and adapted for receiving transmissions from the mobile station, the method comprising:
receiving, at the mobile station, a first signalling corresponding to a first algorithm corresponding to a first selection mode for estimating a propagation loss metric $L_{UL}$ for the mobile station;
in response to the first signalling, adjusting uplink transmission power based on the propagation loss metric $L_{UL}$ for the mobile station based on applying the first algorithm, wherein the propagation loss metric $L_{UL}$ is a weighted sum of individual propagation losses $L_n$ from the mobile station to the coordinated reception points expressed in decibels (dB) multiplied with associated weights $w_n$, wherein a first weight corresponding to a first propagation loss value is different than a second weight corresponding to a second propagation loss value;
receiving, at the mobile station, a second signalling corresponding to a second algorithm corresponding to a second selection mode for estimating a second propagation loss metric $L_{UL}$ for the mobile station; and
in response to the second signalling, adjusting the uplink transmission power based on the second propagation loss metric $L_{UL}$ for the mobile station based on applying the second algorithm.

15. A network control device adapted for controlling one or more functions in a wireless communication system, the wireless communicating system comprising at least one mobile station and N number of coordinated reception points with indices n=1, . . . , N, the coordinated reception points being spatially separated and adapted for receiving transmissions from the at least one mobile station, the network control device comprising:
 a processor configured to, based on a first algorithm corresponding to a first selection mode for estimating a propagation loss metric $L_{UL}$ for the at least one mobile station, estimate the propagation loss metric $L_{UL}$ for the at least one mobile station, the propagation loss metric $L_{UL}$ being a weighted sum of individual propagation losses $L_n$ from the at least one mobile station to the coordinated reception points expressed in decibels (dB) multiplied with associated weights $w_n$, wherein a first weight corresponding to a first propagation loss value is different than a second weight corresponding to a second propagation loss value; and
 a transmitter configured to transmit the propagation loss metric $L_{UL}$ or a power adjustment parameter based on the propagation loss metric $L_{UL}$ to the at least one mobile station for power control of the at least one mobile station;
 wherein the processor is further configured to, based on a second algorithm corresponding to a second selection mode for estimating a second propagation loss metric $L_{UL}$ for the at least one mobile station, estimate the second propagation loss metric $L_{UL}$ for the at least one mobile station; and
 wherein the transmitter is further configured to transmit the second propagation loss metric $L_{UL}$ or a second power adjustment parameter based on the second propagation loss metric $L_{UL}$ to the at least one mobile station to adjust the power control of the at least one mobile station.

16. The device according to claim 15, wherein the propagation loss metric $L_{UL}$ is given by:

$$L_{UL} = \sum_{n=1}^{N} w_n L_n, \text{ where } \sum_{n=1}^{N} w_n = 1.$$

17. The device according to claim 15, wherein the propagation loss metric $L_{UL}$ takes values in the range of $[L_{UL,min}, L_{UL,max}]$, wherein $$L_{UL,min} = \min_{n=1...N} L_n \text{ and } L_{UL,max} = \max_{n=1...N} L_n.$$

18. The device according to claim 15, wherein a sum of the weights $w_n$ is equal to one, and the weights $w_n$ are determined according to any of the following algorithms:
 setting all weights to zero except one weight which corresponds to a minimum propagation loss value, i.e.

$$L_{UL,min} = \min_{n=1...N} L_n;$$

setting all weights to zero except one weight which corresponds to a maximum propagation loss value, i.e.

$$L_{UL,max} = \max_{n=1...N} L_n;$$

choosing the weights $w_n$ to be inversely proportional to the number of coordinated reception points N;
 choosing the weights $w_n$ to be inversely proportional to a normalised individual propagation loss to each coordinated reception point expressed in dB;
 choosing the weights $w_n$ to be inversely proportional to a normalised individual propagation loss to each coordinated reception point expressed in linear scale;
 choosing the weights $w_n$ to be directly proportional to a normalised individual propagation loss to each coordinated reception point expressed in dB;
 choosing the weights $w_n$ to be inversely proportional to a normalised exponentially scaled individual propagation loss to each coordinated reception point expressed in dB; or
 choosing the weights $w_n$ to be directly proportional to a normalised exponentially scaled individual propagation loss to each coordinated reception point expressed in dB.

19. The device according to claim 15, wherein the weights $w_n$ are calculated from a subset of the number of coordinated reception points N so that weights associated with coordinated reception points outside the subset are set to zero.

20. The device according to claim 15, wherein estimating the propagation loss metric $L_{UL}$ for the at least one mobile station is based on a selection mode associated with a performance metric, wherein the performance metric comprises one of the following: a wireless communication system throughput, individual quality of service (QoS) requirements for the mobile station, interference coordination, or mitigation.

21. A mobile station device adapted for communicating in a wireless communication system comprising at least one mobile station and N number of coordinated reception points with indices n=1, . . . , N, the coordinated reception points being spatially separated and adapted for receiving transmissions from the mobile station, the mobile station device comprising:
 a receiver configured to receive a first signalling corresponding to a first algorithm corresponding to a first selection mode for estimating a propagation loss metric $L_{UL}$ for the mobile station;
 a processor configured to adjust uplink transmission power based on the propagation loss metric $L_{UL}$ for the mobile station, wherein the propagation loss metric $_{UL}$ is a weighted sum of individual propagation losses $L_n$ from the mobile station to the coordinated reception points expressed in decibels (dB) multiplied with associated weights $w_n$, wherein a first weight corresponding to a first propagation loss value is different than a second weight corresponding to a second propagation loss value;
 wherein the receiver is further configured to receive a second signalling corresponding to a second algorithm corresponding to a second selection mode for estimating a second propagation loss metric $L_{UL}$ for the mobile station; and
 wherein the processor is further configured to, in response to the second signalling, adjust the uplink transmission power based on the second propagation loss metric $L_{UL}$ for the mobile station based on applying the second algorithm.

* * * * *